Figure 1:
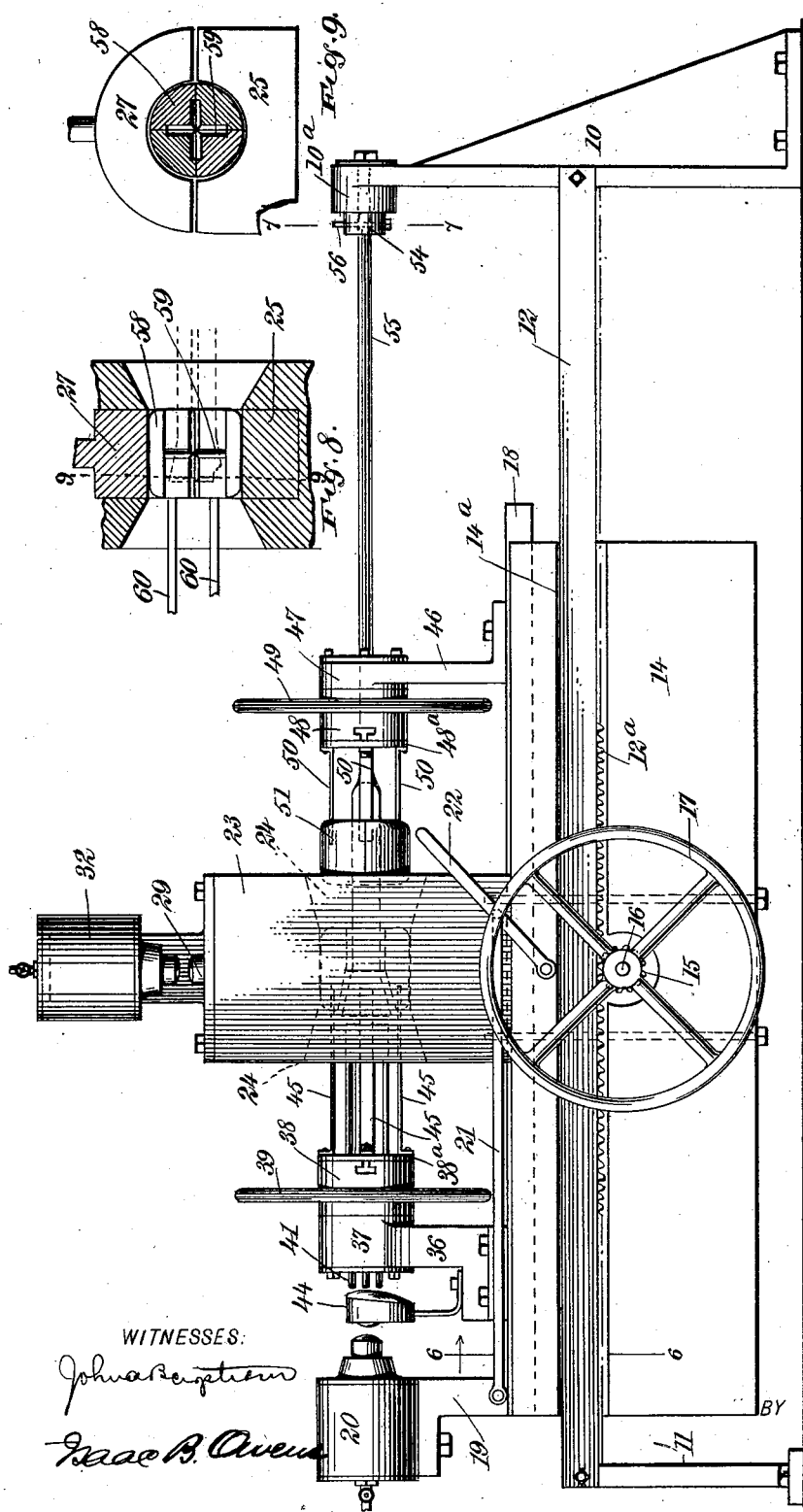

No. 755,351. PATENTED MAR. 22, 1904.
J. J. BROSSOIT.
MACHINE FOR REPAIRING DRILLS.
APPLICATION FILED NOV. 13, 1902.
NO MODEL. 3 SHEETS—SHEET 1.

WITNESSES:
INVENTOR
James J. Brossoit
BY
ATTORNEYS.

No. 755,351. PATENTED MAR. 22, 1904.
J. J. BROSSOIT.
MACHINE FOR REPAIRING DRILLS.
APPLICATION FILED NOV. 13, 1902.
NO MODEL. 3 SHEETS—SHEET 2.
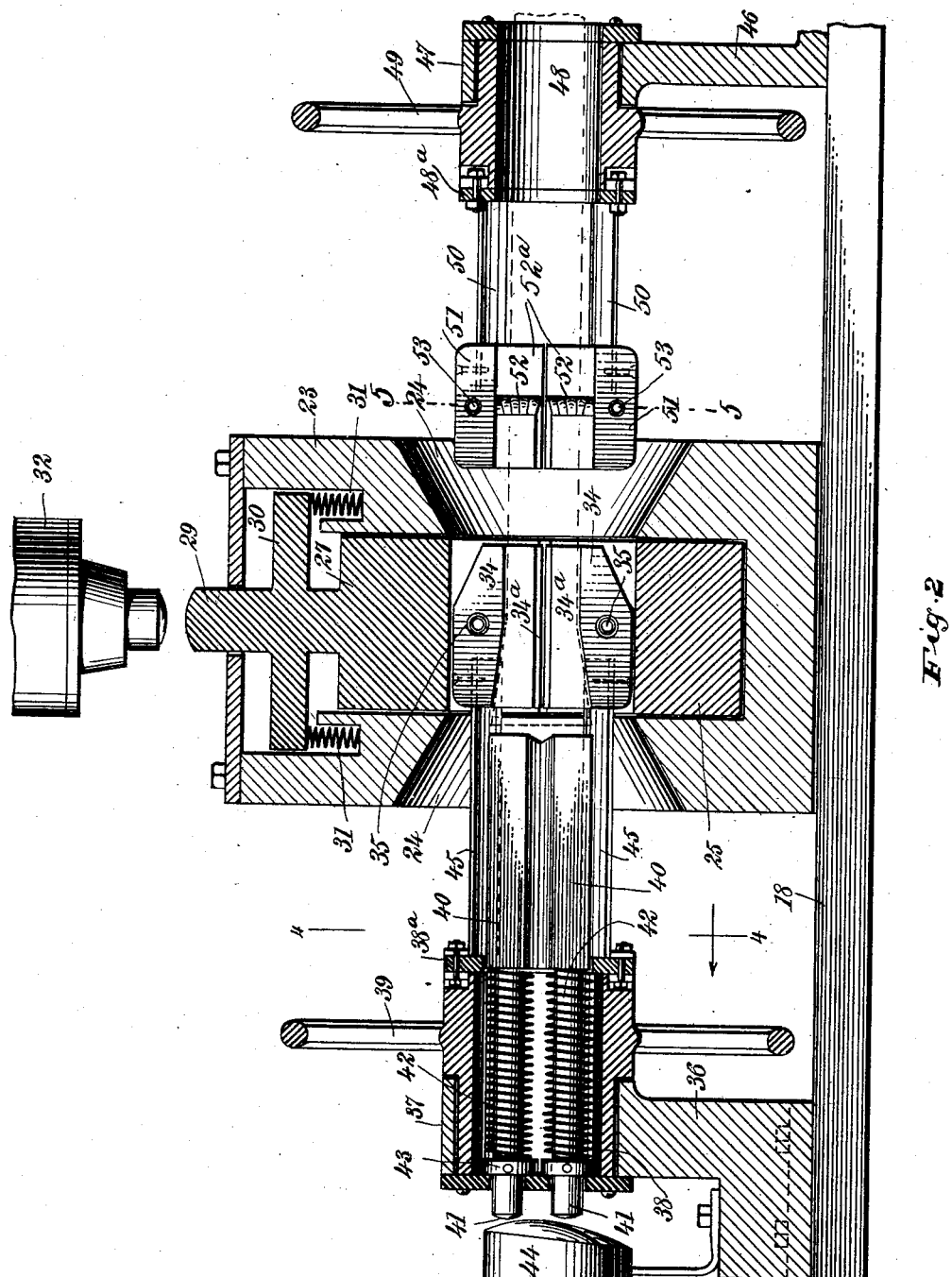
Fig. 2
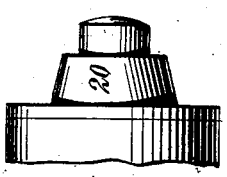
WITNESSES:
INVENTOR
James J. Brossoit
BY
ATTORNEYS.

No. 755,351. PATENTED MAR. 22, 1904.
J. J. BROSSOIT.
MACHINE FOR REPAIRING DRILLS.
APPLICATION FILED NOV. 13, 1902.
NO MODEL. 3 SHEETS—SHEET 3.
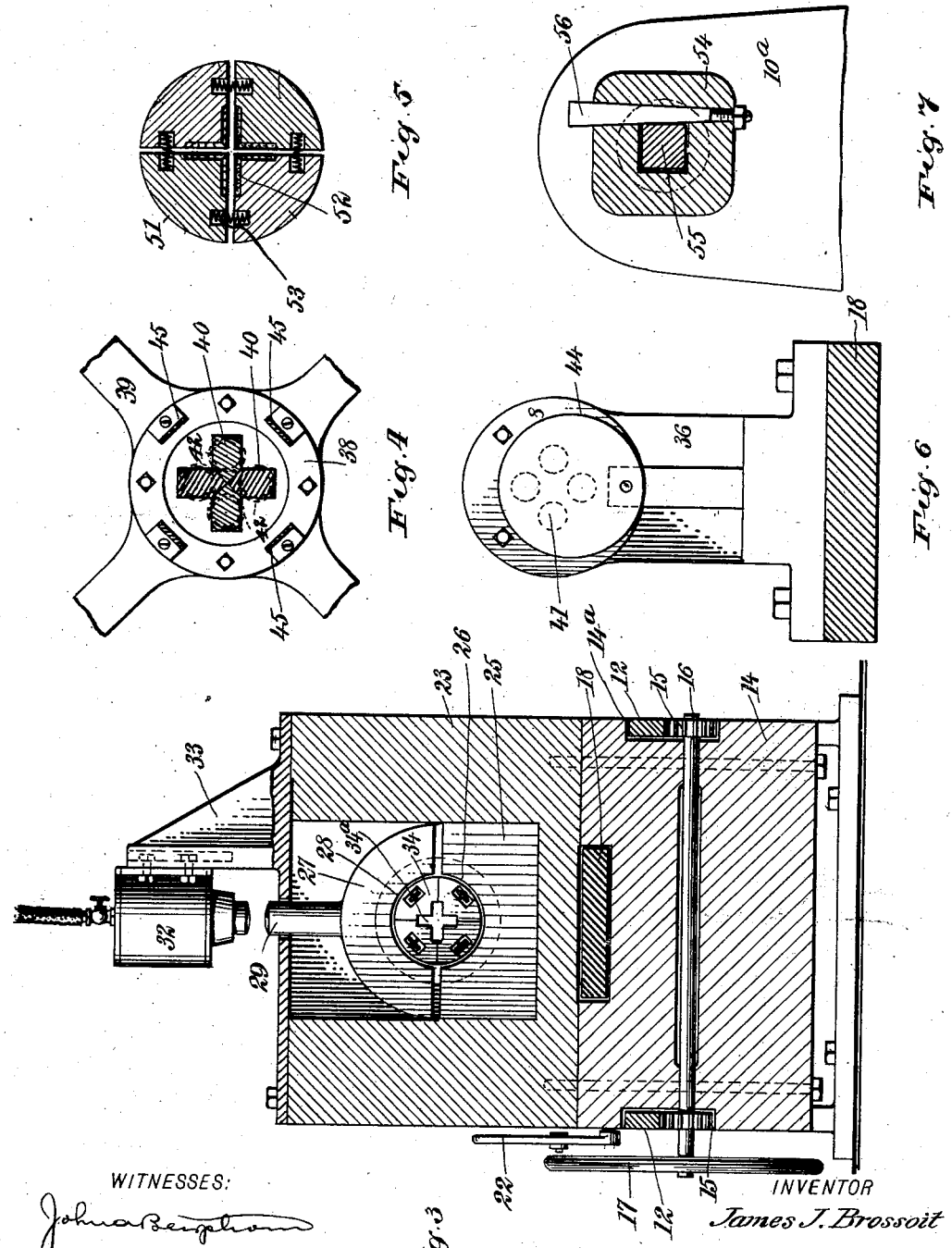

No. 755,351. Patented March 22, 1904.

UNITED STATES PATENT OFFICE.

JAMES JOSEPH BROSSOIT, OF GRANITE, MONTANA.

MACHINE FOR REPAIRING DRILLS.

SPECIFICATION forming part of Letters Patent No. 755,351, dated March 22, 1904.

Application filed November 13, 1902. Serial No. 131,118. (No model.)

*To all whom it may concern:*

Be it known that I, JAMES JOSEPH BROSSOIT, a citizen of the United States, and a resident of Granite, in the county of Granite and State of Montana, have invented a new and Improved Machine for Repairing Drills, of which the following is a full, clear, and exact description.

This invention relates to an apparatus for repairing machine-drills, particularly those having cruciform bits used in rock-drilling machines.

The invention comprises means for cutting and shaping the bit of the drill so as to repair any break therein and to sharpen the dulled cutting edges. By means of the apparatus involved these operations may be performed on the drill accurately and quickly by machine-power, and thus a decided advantage over hand-work is attained.

This specification is a specific description of one form of the invention, while the claims define the actual scope thereof.

Reference is to be had to the accompanying drawings, forming a part of this specification, in which similar characters of reference indicate corresponding parts in all the figures.

Figure 1 is a side elevation of the apparatus. Fig. 2 is an enlarged sectional view showing the edger, swager, and bur in place on the drill and illustrating the operating devices of said tools. Fig. 3 is a cross-section of the machine, showing the swager in place between the hammer-blocks. Fig. 4 is a cross-section on the line 4 4 of Fig. 2. Fig. 5 is a cross-section of the bur on the line 5 5 of Fig. 2. Fig. 6 is a section elevation looking from the line 6 6 in Fig. 1 and showing particularly the driving-tool for the edger. Fig. 7 is a detail section on the line 7 7 of Fig. 1. Fig. 8 is a longitudinal section of the cutter, and Fig. 9 is a cross-section thereof on the line 9 9 of Fig. 8.

The machine comprises end frames 10 and 11, between which extend horizontal side bars or rails 12, said bars or rails 12 having the carriage 14 mounted to slide thereon by means of grooves $14^a$, formed in the sides of the carriage and loosely receiving the said rails 12. Racks $12^a$ are formed on the lower edges of the side rails 12, and these are in mesh with pinions 15, fastened on a shaft 16, which extends transversely through the carriage 14 and carries at one end a hand-wheel 17, by which said shaft may be rotated. This construction is best illustrated in Fig. 3, and by its means the carriage 14 may be moved in either direction along the rails 12. Mounted on top of the carriage and let into the same is a slide 18, which has at its left-hand end an upwardly-extending arm 19, carrying a pneumatic hammer 20. To this arm 19 or to any other convenient part of the slide 18 is connected a link 21, which in turn is connected to a hand-lever 22, fulcrumed on the carriage 14. By means of these parts 21 and 22 the slide 18 may be moved longitudinally on the carriage for a purpose which will be hereinafter described.

Sustained on and fastened to the carriage 14 is a housing 23, having openings 24 in its front and rear sides, said openings being longitudinally alined and flaring outward for a purpose which will be hereinafter described. Within the cavity of the housing 23, as best indicated in Figs. 2 and 3, is located a bed-block or anvil 25, having a semicircular depression 26 in its top surface. Over this bed-block is located a hammer-block 27, with a semicircular depression or cavity 28 in its under side, these depressions or cavities 26 and 28 matching to form a full circle. The hammer-block 27 has a stem 29 attached thereto and projecting upward through the top of the housing 23. Below the top of the housing 23 is located a cross-head 30, connected with the stem 29 and engaged by springs 31, which tend to press upward the hammer-block 27.

32 indicates a pneumatic hammer sustained by a bracket 33 on top of the housing 23 and adapted to strike the stem 29 of the hammer-block 27.

Movable between the bed-block 25 and the hammer-block 27 are arranged the four sections 34 of the die or swager. These sections are quadrant-shaped and have working surfaces (indicated at $34^a$) which produce a cruciform orifice in the swager. (See Fig. 3.)

35 indicates springs which press said sections apart and hold them normally in inactive position. When the hammer-block 27 descends on the die-sections, these sections are caused to contract on the tool and shape the same. Said sections are shown in operative position in Figs. 2 and 3.

A bracket 36 is mounted on the left-hand or rear-end portion of the slide 18, and this bracket carries a box 37, which is longitudinally alined with the openings 24 of the housing 23. In this box is arranged to turn the hub 38 of a hand-wheel 39. The sections of the die or swager are connected to and supported from the hub 38 by spring-arms 45 and a face-plate 38$^a$, removably fastened to the hub. The parts 38 and 39 are free to turn, supported by the bracket 36, and the hub 38 of the hand-wheel carries the four edging-tools 40. These tools are independently movable axially and are disposed in cruciform relation, as indicated best in Fig. 4, this peculiar relation following the form of the drill-bit, as will be understood. Said edging-tools 40 have shanks 41, which are projected through the hub 38 of the wheel 39 and extend out rearward thereof. The front ends of the tools 40 are V-shaped, so that when they strike the drill this shape is communicated to the drill.

42 indicates springs which are located in the hub 38. These springs bear between collars 43 on the stems 41 and the face-plate 38$^a$ of the hub, (see dotted lines in Fig. 4,) thus holding the tools 40 in their rearward position. Mounted on the bracket 36 in position to strike the stem 41 which is rearwardmost of the group of stems (see Fig. 6) is a spring-sustained hammer-block 44, this block having a protruded portion on its face and being placed in front of the pneumatic hammer 20, so as to be struck thereby. The blow of the hammer is therefore transmitted by the block 44 to the stem 41 which lies opposite said protruded portion of the face of the block, and by means of the hand-wheel 29 the hub 38, with the tools 40 attached thereto, may be turned around, so that the stems 41 may be successively placed opposite said protruded portion of the block and thus successively subjected to the action of the hammer.

At the front end of the slide 18 a bracket or pedestal 46 is located, this bracket projecting upward and having a bearing 47, in which is arranged the hub 48 of a hand-wheel 49, these parts 48 and 49 being essentially the same as the parts 38 and 39, before described. The wheel 49 is free to turn in the bearing 47, and the hub 48 carries through the medium of its removable face-plate 48$^a$ four spring-arms 50, which extend rearward and have connected respectively thereto the four quadrantal sections 51 of the bur. On the inner faces of these sections are formed teeth 52, which lie opposite each other in pairs in the form of a cross (see Fig. 5) and which extend diagonally outward from the meeting faces of the sections 51. From the outer edges of these teeth or serrations 52 cavities 52$^a$ in the sections 51 extend to the right-hand ends of the sections, (see Fig. 2,) said cavities matching to receive the head of the drill when the teeth act thereon. These four sections 51 are pressed into open position by springs 53, the same as the springs 35 before described, and said tool 51 is capable of being entered into the housing 23 between the blocks 25 and 27 in place of the die-sections 34, this operation being effected as will be hereinafter fully described.

58 indicates the four quadrantal sections of the cutter which are formed with blades 59 thereon, these blades meeting, as in Fig. 9, to cut off the end of the drill. These sections 58 are carried by spring-arms 60, the same as the arms 45 and 50 before described, and said arms 60 are in turn fastened to a face-plate (not shown) similar to the face-plates 38$^a$ and 48$^a$, so that upon removing either of the tools 34 or 51 the cutter may be placed in their stead. In Figs. 8 and 9 the parts 25 and 27 are illustrated in the position which they occupy with respect to the cutter when the latter is in place.

The end frame 10 has an upward extension terminating in a box 10$^a$, and this box is provided with a bushing 54, mounted to turn therein. Said bushing is adapted to receive the shank of the drill, as indicated at 55 in Figs. 1 and 7, and 56 indicates a key which passes through the bushing 54 and is adapted to wedge the shank 55 securely in the bushing. By this means the drill is mounted to turn. The drill extends rearward through the hub 48 and into the housing 23, as indicated by dotted lines in Figs. 1 and 2.

In operation, should the drill which is to be repaired be badly broken, the cutter 58 should be applied to one of the hubs 38 or 48 in place of the swager or bur, and then the carriage 14 (the heated drill being in place, as shown) should be adjusted so that the point of the drill will lie between the blocks 25 and 27. After this the slide 18 should be moved to enter the cutter over the point of the drill, or, in other words, to occupy the position occupied by the swager 34 in Fig. 2. Then by the operation of the hammer 32 the blades 59 of the cutter will act to trim off the point of the drill. Should the drill be only dulled, this operation need not be performed. The next step is to replace the swager or the bur, as the case may be, by the respective heads 38 and 48, and then the slide 18 should be moved to enter the bur into the space between the blocks 25 and 27. Upon the operation of the hammer 32 the roughened surfaces 52 of the bur will act to draw out and spread the blunt cutting edge of the drill into what is commonly termed a "feathered" edge. Then the slide 18 should be moved to place the swager under the hammer 32, (see Fig. 2,) and upon the operation of the hammer the drill will be stamped up into its proper cruciform shape. Finally, the edgers 40 are opposed to the drill, and the hammer 20 is operated to drive the edgers up against the point of the drill and form the usual V-shaped cutting edges thereon. During these operations the wheels 39 and 49 should be turned to turn the drill and the various tools, so that the several sections of the tools 34, 51, and 58 will be successively presented to the hammer. This turning is also necessary in operating the edgers, since the block 44 is arranged to strike only one of the stems 41 at a time, and by turning the wheel 39 the stems 41 are successively presented to the block.

By operating only one of the edgers and one section only of the other tools at each blow of the hammers 20 and 32 the force of the hammers is not spread out over the whole drill at each operation, but is confined to a separate part thereof. After one blow of the hammers is struck the tools are turned to present a second edger or a second section of one of the other tools to the hammers, and by this mode of operation thoroughly-effective results are attained.

By means of this apparatus the tools may be caused to accurately and quickly work on the drill. The drill of course should be heated before it is introduced into machine, and owing to the peculiar arrangement of the parts the action of the various tools may be brought about so rapidly as to effect all of the operations before the drill has cooled to any material extent.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. The combination of a housing, a hammer working therewith, a sectional tool capable of fitting within the housing and of being actuated by the hammer, a second tool movable axially toward and from the first tool, means for driving the second tool, and a means for mounting both tools to permit the simultaneous rotation thereof.

2. In a machine for repairing drills, the combination of a housing, a hammer working therewith, a sectional tool capable of projecting into the housing, a mounted wheel, spring-arms attached to the wheel and carrying the sections of the tool, a second tool carried by the wheel to move axially toward and from the first-named tool, and means for operating the second tool.

3. In a machine for repairing drills, the combination of a stationary framing, comprising a horizontal rail, a carriage mounted to move on said rail, a hammer mounted on the carriage, a slide mounted to move on the carriage, tools mounted on the slide at opposite sides of the hammer, said tools being movable with the slide alternately to coact with the hammer, and means for attaching the drill to the said framing.

4. In a machine for repairing drills, the combination with a framing, comprising horizontal rails, of a carriage mounted to move thereon, gearing having elements respectively on the carriage and rails to facilitate the operation of the carriage, a slide movable on the carriage, a connection between the carriage and slide to move the latter, a hammer mounted on the carriage, two tools mounted on the slide at opposite sides of the hammer and movable with the slide alternately to coact with the hammer, and means on the framing for attaching the drill.

5. In a machine for repairing drills, the combination of a stationary framing, comprising horizontal rails, a carriage mounted to move on said rails, a hammer mounted on the carriage, a slide mounted to move on the carriage, tools mounted on the slide at opposite sides of the hammer, said tools being movable with the slide alternately to coact with the hammer, and means for attaching the drill to the said framing, the said tools being each in sections independently movable and being mounted to turn on the slide to present said sections successively to the hammer.

6. In a machine for repairing drills, the combination of a framing, comprising a horizontal rail, a carriage movable thereon, a hammer mounted on the carriage, a slide mounted to move on the carriage, two tools each comprising independent sections, spring-arms attached to said sections, members to which the spring-arms of each tool are respectively attached, means for revolubly mounting said members, the tools coacting with the hammer substantially as described, and means on the framing for attaching a drill thereto.

7. The combination with a support, of a housing, a hammer mounted therein, a sectional tool, and means for mounting the sectional tool to turn in the housing.

8. The combination with a support, of a housing mounted thereon, a hammer movable in the housing, a sectional tool, arms attached to the sections of said tool, a member to which said arms are connected, and means for mounting said member to turn and means to move said member toward and from the housing, whereby the tool-sections may be projected into the housing and turned therein.

9. In a machine for repairing drills, the combination with a support and a hammer thereon, of a plurality of tool-sections, spring-arms attached thereto, a member to which said arms are connected, means for revolubly mounting said member, edgers movable longitudinally of the spring-arms toward and from the said tool-sections, said edgers passing through the center of the means for mounting the spring-arms to turn, and means for operating the edgers.

10. In a machine for repairing drills, the combination with a support and a hammer, of a plurality of tool-sections adapted to coact with the hammer, spring-arms to which said sections are attached, a hub with which said arms are connected, means in which the hub is mounted to turn, edgers also mounted in the hub and movable longitudinally of said spring-arms, and a means for operating the edgers.

11. In a machine for repairing drills, the combination with a support and a hammer, of a plurality of tool-sections adapted to coact with the hammer, spring-arms to which said sections are attached, a hub with which said arms are connected, means in which the hub is mounted to turn, edgers also mounted in the hub and movable longitudinally of said spring-arms, and a means for operating the edgers, the said means for operating the edgers comprising a hammer-block movable toward and from the edgers and a hammer operating the block.

12. A machine for repairing drills having a bur or drawing-tool, comprising a plurality of independently-movable sections adapted to embrace the drill, and formed with diagonal serrated or roughened portions adapted to be engaged with the cutting edges of the drill, for the purpose specified, and also having matching cavities adjacent to the said serrated portions to receive the head of the drill.

13. In a machine for repairing drills, the combination with a support, of a tool comprising a plurality of sections, spring-arms to which said sections are attached, a hub with which the spring-arms are connected, means for mounting the hub to turn, and a hammer coacting with the tool.

14. A machine for repairing drills having a tool comprising a plurality of independently-movable sections with opposing walls forming a cavity to receive the drill, said walls having surfaces thereon to act on the drill, and means for operating the tool, said means for operating the tool comprising a hammer, and the tool being mounted to turn, whereby to present its sections consecutively to the hammer.

In testimony whereof I have signed my name to this specification in the presence of two subscribing witnesses.

JAMES JOSEPH BROSSOIT.

Witnesses:
G. E. SMITH,
WILLIAM HARVEY.